United States Patent de Queiroz

[11] Patent Number: 5,838,831
[45] Date of Patent: Nov. 17, 1998

[54] COMPRESSION OF IMAGE DATA WITH RETAINING COST DATA FOR EACH COMPRESSED IMAGE BLOCK

[75] Inventor: Ricardo L. de Queiroz, Fairport, N.Y.

[73] Assignee: Xerox Corporation, Stamford, Conn.

[21] Appl. No.: 721,519

[22] Filed: Sep. 26, 1996

[51] Int. Cl.[6] ............................... G06K 9/36; G06K 9/46
[52] U.S. Cl. ..................... 382/248; 382/232; 382/235; 382/250
[58] Field of Search ..................................... 382/248, 250, 382/235, 232; 358/261.4, 426, 427, 433, 261.3, 432

[56] References Cited

U.S. PATENT DOCUMENTS

| 5,229,864 | 7/1993 | Moronaga et al. | 358/433 |
| 5,257,113 | 10/1993 | Chen et al. | 358/426 |
| 5,327,248 | 7/1994 | Miller et al. | 358/261.4 |
| 5,379,122 | 1/1995 | Eschbach | 358/426 |
| 5,408,328 | 4/1995 | Boliek et al. | 358/261.4 |
| 5,521,718 | 5/1996 | Eschbach | 358/432 |

OTHER PUBLICATIONS

W. B. Pennebaker and J.L. Mitchell, JPEG: Still Image Compression Standard, New York, NY: Van Nostrand Reinhold, 1993.

*Primary Examiner*—Leo H. Boudreau
*Assistant Examiner*—Bmitry A. Novik
*Attorney, Agent, or Firm*—R. Hutter

[57] ABSTRACT

An enhancement to the standard JPEG image data compression technique includes a step of recording the length of each string of bits corresponding to each block of pixels in the original image at the time of compression. The list of lengths of each string of bits in the compressed image data is retained as an "encoding cost map" or ECM. The ECM, which is considerably smaller than the compressed image data, can be transmitted or retained in memory separate from the compressed image data along with some other accompanying information and is used as a "key" for editing or segmentation of the compressed image data.

3 Claims, 2 Drawing Sheets

5,838,831

COMPRESSION OF IMAGE DATA WITH RETAINING COST DATA FOR EACH COMPRESSED IMAGE BLOCK

CROSS-REFERENCE TO RELATED APPLICATION

Reference is made to the following co-pending patent application: Ser. No. 08/721,074 docket number D/96091), entitled "Using Encoding Cost Data for Segmentation and Background Suppression in JPEG-Compressed Images."

INCORPORATION BY REFERENCE

The following U.S. patents, assigned to the assignee hereof, are hereby incorporated by reference: U.S. Pat. No. 5,379,122, entitled "Decompression of Standard ADCT-Compressed Images," and U.S. Pat. No. 5,521,718, entitled "Efficient Iterative Decompression of Standard ADCT-Compressed Images."

FIELD OF THE INVENTION

The present invention relates to a method for compressing image data, generally as would be practiced under the JPEG (Joint Photographic Expert Group) standard, with the addition of retaining information which is derived as a result of the compression, which can be accumulated into an "encoding cost map."

BACKGROUND OF THE INVENTION

U.S. Pat. No. 5,379,122, incorporated by reference above, gives a general overview of a data-compression technique which is consistent with the JPEG device-independent compression standard. The details of the operation of the JPEG standard are given in the patent, but for present purposes, the essential properties of JPEG compression are as follows. An original image which is desired to be transmitted from one hardware device to another, or which is to be retained in an electronic memory, is divided into a two-dimensional array of typically square blocks of pixels. In one typical embodiment, the original image is divided into blocks with each block comprising 8×8=64 pixels from the original image. Each individual pixel in the image, in turn, may express a grayscale value, which may be on a scale from, for example, 0 to 255 or 0 to 4095. There is thus derived from each block in an image to be transmitted a matrix of 64 gray level values, each value relating to one pixel in an 8×8 matrix. This matrix is then subjected to certain mathematical operations. For example, the first step is to perform a "discrete cosine transform," or DCT. In effect, the DCT changes the image space for the matrix, so that a vector related to the average luminance of all of the pixels in the block is made into an axis of the space. Following the DCT, the coefficients in the original matrix still completely describe the original image data, but larger value coefficients tend to cluster at the top left corner of the matrix, in a low spatial frequency region. Simultaneously, the coefficient values toward the lower right hand portion of the matrix will tend toward 0.

The top-left entry in each matrix, which represents the average luminance of all pixels in the matrix, is known in JPEG as the "DC coefficient" of the block, with all the other entries in the matrix being known in JPEG as the "AC coefficients" of the block. In a preferred embodiment of JPEG, the transmitted DC coefficient of each block is converted to a difference relative to the DC coefficient of the block to the left of the block in the original image; this makes the magnitude of each DC coefficient smaller in absolute terms.

Following the DCT step, individual coefficients in the matrix are quantized, or in effect made into smaller numbers, and rounded. Then, the quantized coefficients are Huffman-encoded to yield a string of binary digits, or bits. There may be further compression steps as well, but the final product is inevitably a string of bits for each block, each block resulting in a string of bits of a different length.

Under JPEG compression, each block of the original image will result in a string of bits of unpredictable length. Because the compressed image data for a successive block is typically transmitted in serial form, there is a problem with identifying, in a stream of data, those portions of the data stream which relate to a particular desired set of blocks in an image. Because the various strings of bits are of unpredictable length, one cannot readily "fast forward" to access a particular desired subset of the compressed image data.

DESCRIPTION OF THE PRIOR ART

U.S. Pat. No. 5,229,864 discloses another decoding/decompression technique which uses a "data code counting section." The data code counting section determines the amount of coded data in each block of the compressed picture data. This count of data in each block is then used as part of an "interblock filter" which normalizes image data of adjacent blocks in order to eliminate or reduce an edge or other distortion appearing at the border between blocks in the reconstructed image.

U.S. Pat. No. 5,257,113 discloses a system for creating "windowed" (multi-image) images from plural streams of JPEG-compressed data. A stream of image data for each window is divided into coding intervals, and each coding interval is compressed and mixed. The mixed compressed data is then decompressed for display.

U.S. Pat. No. 5,327,248 discloses a system for editing JPEG-compressed images. Absolute values of DC components of compressed image blocks are retained for the left edge of an image, so that the compressed image may be imported into another image. The patent also discloses, at column 2, lines 20–25, "tagging" compressed image blocks with how many bits are contained in the block, but there is no disclosure of transmitting these bit counts to a receiver.

U.S. Pat. No. 5,521,718, assigned to the assignee hereof, discloses a method of decompressing a document image which has been compressed with JPEG and a subsequent statistical encoding method. As part of this method, one of the first steps in decompression is to measure the length of the Huffman-coded data in the received compressed image data, and deriving therefrom an "iteration number." This "iteration number" can then be used as a hint to a subsequent filtering stage as to the essential nature of the image in the particular block, e.g., whether it is a contone or halftone image. Different derived iteration numbers will inspire the use of different image-processing techniques in the restructuring of the final received image.

One basic text which describes JPEG and associated techniques is W. B. Pennebaker and J. L. Mitchell, *JPEG: Still Image Compression Standard*, New York, N.Y.: Van Nostrand Reinhold, 1993.

SUMMARY OF THE INVENTION

According to the present invention, there is provided a method of processing digital data forming an image, the data being organized at a set of blocks, with each block corresponding to an area of the image. Each block is compressed, yielding a string of bits for each block. The number of bits in each string of bits is counted. A cost function is recorded for each string of bits, the cost function being a number related to the number of bits in each string of bits. The cost function of each string of bits is transmitted to a receiver.

In the claims herein, it will be understood that the steps of "transmitting" and "receiving" various portions of data will be deemed to encompass placing certain data in an electronic memory and then removing it at a later time, even if the same general apparatus performs both the placing and retrieving. "Transmitting" will include placing in the memory, and "receiving" will include retrieving from the memory.

DETAILED DESCRIPTION OF THE INVENTION

Figure 1:
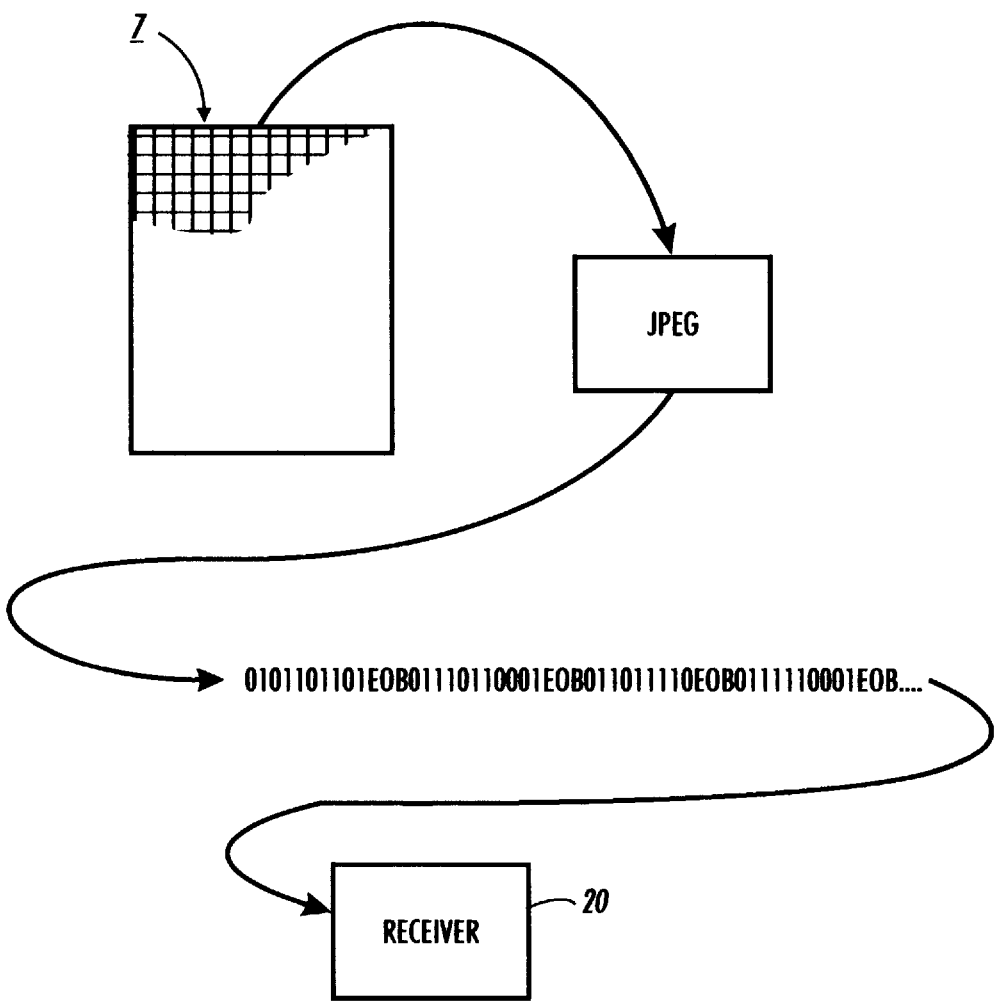
FIG. 1 is a simplified diagram illustrating how the JPEG compression technique is applied to an original image.

FIG. 1 is a simplified symbolic rendering of the JPEG compression technique. An original image, indicated as 1, is retained as a quantity of digital data, such as by scanning a hard-copy image, or otherwise creating an image electronically, as on a computer. The original image I is divided into a number of square blocks, in a typical case each square block comprising 64 pixels in an 8×8 array. Each of these blocks forming image 1 is then submitted to a JPEG compression technique which, as known in the prior art, converts each image block into a string of binary digits (bits), with each string of bits being of an unpredictable length. As shown in FIG. 1, each string of bits emerging from the JPEG technique ends with a special sequence of bits which are recognized by a decompression system as indicated as "end of block," or EOB. In the special case where all the quantized DCT coefficients are non-zero, there is no need for inserting the EOB symbol. As shown in FIG. 1, the letters EOB are used to show an end of block, but in a real-world situation, the EOB symbol would be a recognizable unique sequence of 0's and 1's, such as 1010. The strings of bits, each representing one block of pixels, is then sent to a "receiver," which as mentioned above can be in the form of a memory from which the compressed image data can be retrieved at a later time.

(Although the present embodiment of the invention describes each block as representing a square array of pixels in an image, it is conceivable, under the claims herein, that a "block" could comprise a non-square or even a linear array of pixels within the image. Also, a "block" may correspond to any predefined region of an image encompassing multiple colors. In a preferred embodiment, one or a plurality of blocks of each color separation can be grouped to form larger structures known in JPEG as a minimum coded unit, or MCU. According to the present invention, it is understood that a "block" may represent one or multiple blocks, or one or multiple MCUs).

The proposed method may be used in combination with "restart markers," which are a utility available within the JPEG standard. A "restart marker" is an optional resource defined by JPEG comprising a specific and unique byte-aligned sequence of bits that can be inserted in the compressed bit stream. When used, it is placed periodically in the bit stream after a fixed number of compressed image blocks.

Figure 2:
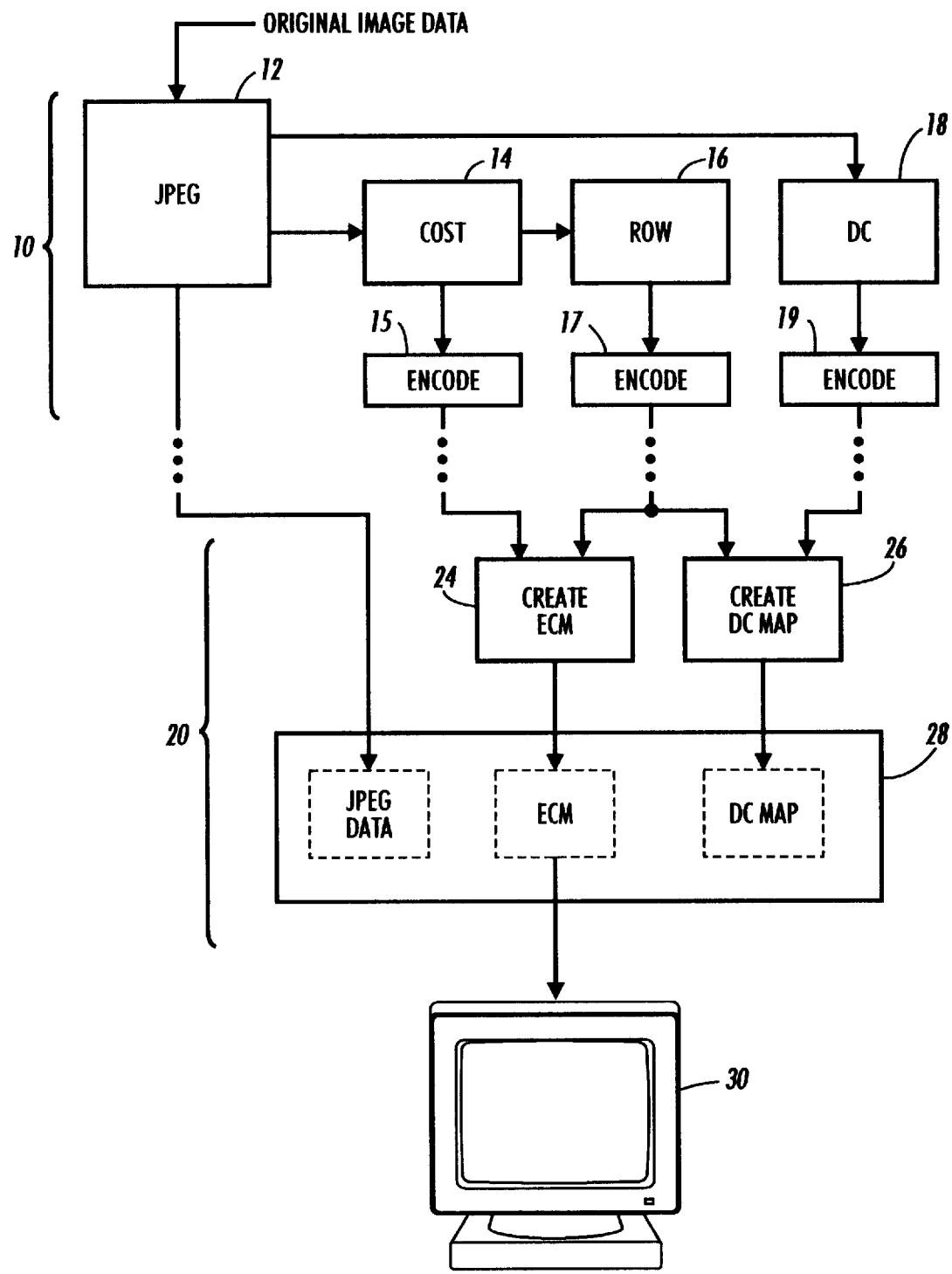
FIG. 2 is an illustration of the relationship of the "side information" of the present invention to compressed image data.

FIG. 2 is a simplified diagram illustrating the compression and transmission method of the present invention. Shown in FIG. 2 is a "transmitter" generally indicated as 10, which sends various data to a "receiver" indicated as 20. Once again, as mentioned above, transmitter 10 and receiver 20 could be parts of the same general apparatus, with the "transmission" steps, as recited in the claims, being in the form of placing the transmitted data in a memory for later retrieval by the receiver.

As shown in the Figure, data from the original image to be transmitted, the pixels of which are divided into for example 8×8 pixel blocks, are first compressed by the standard JPEG compression technique, indicated as function 12. However, according to the present invention, beyond the basic steps of JPEG compression, the individual strings of bits, each string corresponding to one block of the original image, are in turn used to derive a "cost function" for each block. The "cost function" is a number related to the length, in number of bits, of a bit string associated with a particular block in the original image. This cost function may be the exact number of bits in a particular string of bits, or could be otherwise related to this number such as the actual number of bits plus or minus some fixed number. This cost function may also count the bits generated by "stuffing bytes" which are defined in the JPEG standard. This calculation of the cost function for each block is shown as function 14 in the Figure.

In a real-world JPEG compression system, the length of the bit string for each block is expected to be small. This cost function may be encoded into an 8-bit cost function entry. It may also be optionally encoded using Huffman or any other entropy coding technique. The 8-bit encoding allows encoding of all values ranging from the minimum permissible amount of bits in a block up to 255 bits per block. The minimum number is never smaller than 2 and its default value for JPEG luminance tables is 4. Unused codes (below the minimum number) may be used to represent an escape sequence to indicate that more than 255 bits were used in the respective block. After the escape sequence, the real cost function is indicated using any simple format.

In addition to deriving the cost function, or number of bits, for each block, it is desirable to calculate at the transmitter 10 information about the sum of the cost functions for each "row of blocks" in the image, such as indicated by function 16 in the Figure. It will be understood that a row of blocks corresponds to a segment of the image encompassing a fixed number of blocks. This "row" may or may not correspond to a row of blocks in a horizontal-scan direction in the image. According to the preferred embodiment of the present invention, whenever JPEG restart markers are not used, a "row of blocks" will preferably imply a segment of blocks corresponding to one horizontal row of blocks in the original image. In the preferred embodiment of this invention, if restart markers are used, a "row of blocks" is understood as a segment of blocks corresponding to fractions of the "section of blocks in between restart markers" or to an integer number of these sections. This "row-sum" can be encoded in typically 2–4 bytes per row without compression, although Huffman-encoding could conceivably be used here, such as at function 17 in the Figure.

Further according to a preferred embodiment of the present invention, there is determined, within transmitter 10, a DC coefficient for each JPEG-compressed block of pixels in the original image, as shown at function 18. Using the DCT, the DC coefficient for each block is merely the top left entry in the data matrix for the particular block, which equals the average luminance for all of the pixels in the block. A preferred, "decimated" form of this DC map has N DC coefficients per "row of blocks". If N=0, the decimated DC map is not stored at all. If "restart markers" are not used, each row of blocks is divided into N sections, and otherwise the "row of blocks" is divided into N+1 sections. Each entry in the map is the DC coefficient of the left most block of each section. This decimated DC map can be encoded using any simple format or it can be compressed by means of entropy coding techniques.

In summary, the basic functions of the transmitter 10, according to the illustrated embodiment of the present invention, are basic JPEG encoding, calculating the cost functions for each JPEG-encoded block, calculating the sum of cost functions for each row of blocks in the image, and calculating the DC coefficients for each or some block of pixels. The cost functions, row functions and DC coefficients can be considered "side information" relative to the compressed image data derived directly from the JPEG compression algorithm. Depending on the particular application of the invention, this "side information" can be transmitted simultaneous with the compressed image data, such as through one or more additional parallel channels, or if the compressed image data is simply to be stored for later retrieval, the side information can be placed in a separate set of portions of the memory. The cost function is generally much smaller than the compressed data itself, being roughly 64 times smaller than the original image size. Therefore, the cost function, and by extension the row functions and DC coefficients, is not a major tax on the capacity of a transmission system.

Looking at the lower half of FIG. 2, there is shown the functions of the "receiver" 20, which once again is merely the set of functions which operate on the compressed image data and the side information, which may in fact be part of the same apparatus as the transmitter 10. One important function of the receiver 20 is to establish a relationship between the cost function and the row functions which are derived from the cost functions, so that an "encoding cost map," or ECM, can be created. An encoding cost map, or ECM, can be defined as a set of the cost functions of various blocks in the original image, understood as a two-dimensional map. This ECM, as will be explained below, can itself be subjected to various image-processing techniques, such as displaying or screening. It is thus clear that the relationship between row functions and cost functions be established so that the various cost functions can be placed into a two-dimensional map. This creation of the ECM is indicated as function 24 in the Figure.

It is also desirable, for reasons which will be explained below, to maintain a separate map of some of the DC coefficients of the original image, which may be useful for subsequent image-processing techniques. This function is shown as 26 in the Figure, although as mentioned above DC coefficients of each block of pixels are always calculated as part of the standard JPEG process. Row data from transmitter 10 can be used to help map the DC coefficents to a two-dimensional map, or other techniques can be used.

Further as shown in the Figure, the compressed image data itself, along with a separately-stored memory of the cost function in the form of the ECM, and a separate storage of the DC map, are maintained in a memory 28. In transmitting the various data (the JPEG-compressed image data itself and the side information) from the transmitter 10 to receiver 20, either the JPEG-compressed image data and the side information may be transmitted simultaneously through parallel channels, or else the side infromation can be transmitted before or after the JPEG-compressed image data.

A key practical advantage of calculating the cost functions or ECM at the compression stage, instead of deriving it at decompression, is that the cost function itself can be used as a substitute for the actual image data for purposes such as previewing, editing, or segmentation. The cost function data can itself be converted into a series of luminances (i.e., the higher of the cost function, the brighter the luminance), and these luminances can be mapped into an image field. Such a function of displaying an ECM as a set of luminances in an image field is illustrated as function 30 in FIG. 2.

When an ECM is displayed as a set of luminances (with higher cost functions corresponding to brighter pixels), the following characteristics will be apparent. First, halftones, such as from lithographic printing creating areas of high frequency changes in contrast, will result in bright areas; sharp edges and high contrast texture areas in contone images will be particularly bright; and edges of letters and graphic elements, that is including image blocks including the border of a dark area and light area, will also be very bright. Similarly, areas of little or no frequency changes, such as background areas and smooth areas in contone images, will appear very dark. In general, the sharper the contrast between adjacent portions of an image in a given area, the longer the resulting bit-string in the compressed image, and therefore the brighter the luminance of that particular portion of the image. Such high-luminance areas can be seen, for example, in the borders (but not the interiors) of text characters.

Beyond providing a quick preview of compressed image data, the cost functions can be used to locate the beginning of data for a desired block of pixels within a large set of blocks forming an entire image, or in other words one can use the ECM to readily locate the data for a smaller image within a larger received image. For example, if one is interested in the data for the 200th block of pixels in a series, because the 200th block marks the top left corner of a portion of the image which is of interest, one can find the bit corresponding to the beginning of the compressed version of the 200th block by adding up the cost functions for blocks 1 to 199 (assuming, in this case, the cost function is merely the number of bits in each string of bits), to find out the location of the beginning of the 200th block in the original compressed image data. If the cost function is not equal to the number of bits in a particular string of bits, but is rather a number derived from the actual number of bits, the actual number of bits can be derived from the cost function through an algorithm. The compressed bit strings with their associated ECM's are received in series. As they are received in series, a count, particularly starting from 1, is assigned to each string of bits and its associated cost function. By simply keeping track of the cost functions in the ECM and being able to connect the cost functions with locations in the compressed image data, one can use the ECM to identify locations in the compressed image data corresponding to locations in the image itself.

For selecting a connected region (for cropping or editing, for example) using the encoding cost map or ECM, the following steps can be taken. The sum of cost functions of the ECM in a particular row RL[i] of image blocks being received, gives the total of bits used to encode each block row in the image. The individual ECM entry for block located at coordinates i,j, given as ECM[i,j], gives the amount of bits used to encode each individual block. Each "row of blocks" is partitioned into sections and the DC map entry DC [i,k] for section k is the actual DC value of the first block in section k of block-row i.

To skip through a long string of data to find the exact position of the desired first block in section k, the binary data can be "fast-forwarded" to a precisely-defined location which corresponds to the first block in section k. For simplicity, the preferred embodiment of the definition of "row of blocks" is assumed and if "restart markers" are used, they are placed in between the rows of blocks. A "file pointer" can be incremented through the raw binary in the ECM to locate desired areas within the received binary data. Assuming one wants to crop the region comprising blocks [i,j] for an area defined by TOP≦i≦BOTTOM between the top and bottom and LEFT≦j≦RIGHT between the left and right edges of the target region.

(1) Skip the top rows, that is, row 0 through row TOP−1.

(2) Perform the following steps for i=TOP through i=BOTTOM:

(3) Skip all blocks in row i until getting to the first block of the section which contains the block with the LEFT coordinates.

(4) A variable D is assigned to be the respective value of DC[i,k] (or to be the decoded DC value of the block, if it coincides with the beginning of a segment defined by a "restart marker").

(5) For each subsequent block in the row, until reaching the LEFT block, decode the DC coefficient, accumulate this value onto D and skip the rest of the block.

(6) Encode D as a JPEG DC value to a buffer. If the original DC value of block [i, LEFT] used t bits to be encoded, write the next (ECM [i, LEFT]−t) bits and all the bits used for the next RIGHT-LEFT blocks to the buffer.

(7) If i does not equal BOTTOM, skip all blocks to the end of the row, otherwise stop.

While the invention has been described with reference to the structure disclosed, it is not confined to the details set forth, but is intended to cover such modifications or changes as may come within the scope of the following claims.

I claim:

1. A method of processing digital data forming an image, the data being organized as a set of blocks, each block corresponding to an area of the image, comprising the steps of:

compressing each block, said compressing step yielding a string of bits for each block;

counting a number of bits in each string of bits;

recording a cost function for each string of bits, said cost function being a number related to the number of bits in each string of bits;

transmitting the cost function of each string of bits to a receiver;

associating each cost function with a predetermined area in a map including a plurality of areas, thereby yielding an encoding cost map;

converting each cost function into a luminance; and displaying the luminance of each cost function in the encoding cost map, with each cost function corresponding to one area in the encoding cost map.

2. A method of processing digital data forming an image, the data being organized as a set of blocks, each block corresponding to an area of the image, comprising the steps of:

compressing each block, said compressing step yielding a string of bits for each block;

counting a number of bits in each string of bits;

recording a cost function for each string of bits, said cost function being a number related to the number of bits in each string of bits;

transmitting the cost function of each string of bits to a receiver; and transmitting a number related to the sum of a plurality of consecutive cost functions.

3. A method of processing digital data forming an image, the data being organized as a set of blocks, each block corresponding to an area of the image, comprising the steps of:

compressing each block, said compressing step yielding a string of bits for each block;

counting a number of bits in each string of bits;

recording a cost function for each string of bits, said cost function being a number related to the number of bits in each string of bits;

transmitting the cost function of each string of bits to a receiver; and transmitting a number related to the sum of the cost functions for a row of blocks in the image.

* * * * *